(12) United States Patent
Srybnik et al.

(10) Patent No.: US 7,564,144 B1
(45) Date of Patent: Jul. 21, 2009

(54) TRANSPORTABLE HYDRO-ELECTRIC GENERATING SYSTEM WITH IMPROVED WATER PRESSURE ENHANCEMENT FEATURE ACTIVATION SYSTEMS

(76) Inventors: Simon Srybnik, 860 United Nations Plz., No. 31E, New York, NY (US) 10017; Louis Srybnik, 200 Central Park South, No. 21 E, New York, NY (US) 10019

( * ) Notice: Subject to any disclaimer, the term of this patent is extended or adjusted under 35 U.S.C. 154(b) by 0 days.

(21) Appl. No.: 12/313,436

(22) Filed: Nov. 20, 2008

(51) Int. Cl.
*F03B 13/00* (2006.01)
*F01D 15/10* (2006.01)
*F02C 6/00* (2006.01)
*H02K 7/18* (2006.01)

(52) U.S. Cl. .......................... 290/54; 290/43
(58) Field of Classification Search ............ 290/52, 290/54
See application file for complete search history.

(56) References Cited

U.S. PATENT DOCUMENTS

| | | | | |
|---|---|---|---|---|
| 1,368,454 A | | 2/1921 | Rebman .................... 416/85 |
| 2,226,926 A | * | 12/1940 | Gordon .................. 100/158 C |
| 2,379,324 A | | 6/1945 | Topalov .................... 415/4.2 |
| 3,209,156 A | | 9/1965 | Struble, Jr. ................. 290/54 |
| 3,339,078 A | * | 8/1967 | Crompton .................. 290/44 |
| 3,807,890 A | | 4/1974 | Wright ..................... 415/3.1 |
| 4,163,904 A | * | 8/1979 | Skendrovic ................ 290/54 |
| 4,253,307 A | * | 3/1981 | Smith ..................... 60/641.9 |
| 4,335,319 A | * | 6/1982 | Mettersheimer, Jr. ....... 290/54 |
| 4,345,160 A | * | 8/1982 | Smith ....................... 290/52 |
| 4,350,900 A | * | 9/1982 | Baughman ................. 290/55 |
| 4,355,513 A | | 10/1982 | Girden ................... 60/641.7 |
| 4,408,127 A | | 10/1983 | Santos, Sr. .................. 290/54 |
| 4,468,153 A | * | 8/1984 | Gutierrez Atencio ......... 405/78 |
| 4,511,808 A | | 4/1985 | Jost .......................... 290/54 |
| 4,746,808 A | | 5/1988 | Kaeser ...................... 290/52 |
| 4,868,408 A | * | 9/1989 | Hesh ......................... 290/52 |
| 4,960,363 A | | 10/1990 | Bergstein .................. 415/3.1 |
| 5,007,241 A | | 4/1991 | Saitou ....................... 60/698 |
| 5,238,749 A | * | 8/1993 | Cueman et al. ............ 428/441 |
| 5,420,463 A | | 5/1995 | Agostino .................... 290/54 |
| 5,440,175 A | * | 8/1995 | Mayo et al. ................. 290/54 |
| 5,947,678 A | * | 9/1999 | Bergstein .................. 415/3.1 |
| 6,132,626 A | * | 10/2000 | Hart ......................... 210/741 |
| 6,743,467 B1 | * | 6/2004 | Jones et al. ................. 427/180 |
| 6,765,308 B1 | | 7/2004 | Kazanjian et al. ........... 290/43 |
| 6,798,080 B1 | | 9/2004 | Baarman et al. ............. 290/43 |
| 6,824,347 B2 | | 11/2004 | Maloney ...................... 415/1 |
| 6,954,006 B2 | | 10/2005 | Williams, Jr. ............... 290/54 |
| 7,084,521 B1 | | 8/2006 | Martin ....................... 290/54 |
| 7,112,892 B2 | | 9/2006 | Mahowald ................... 290/54 |
| 7,116,005 B2 | * | 10/2006 | Corcoran, III .............. 290/43 |
| 7,190,088 B2 | | 3/2007 | Heidel ....................... 290/54 |
| 7,262,517 B1 | | 8/2007 | Srybnik et al. ............. 290/54 |
| 7,375,437 B2 | | 5/2008 | Peckham .................... 290/54 |
| 7,425,772 B2 | * | 9/2008 | Novo Vidal ................. 290/52 |
| 7,456,514 B2 | * | 11/2008 | Ahmad ...................... 290/54 |
| 7,466,035 B1 | * | 12/2008 | Srybnik et al. ............. 290/43 |

(Continued)

*Primary Examiner*—Julio C Gonzalez
*Assistant Examiner*—Pedro J Cuevas (57) ABSTRACT

The invention is a transportable hydroelectric power generating system which is capable of being fully or partially assembled in a factory setting and then transported to a water stream. The system includes either a wind-driven or solar-powered pump or both features which serve to further supply pressurized water to the impellers on the water wheels. Thus marginal streams may become power generating sites.

20 Claims, 13 Drawing Sheets

U.S. PATENT DOCUMENTS

| | | | |
|---|---|---|---|
| 2008/0164699 A1* | 7/2008 | Vieira | 290/54 |
| 2008/0169654 A1* | 7/2008 | Omer | 290/4 R |
| 2008/0179888 A1* | 7/2008 | Krouse | 290/54 |
| 2008/0211233 A1* | 9/2008 | Farrelly | 290/54 |
| 2008/0217923 A1* | 9/2008 | Yen | 290/54 |
| 2008/0258467 A1* | 10/2008 | Wilson et al. | 290/54 |
| 2008/0265583 A1* | 10/2008 | Thompson | 290/54 |

* cited by examiner

TRANSPORTABLE HYDRO-ELECTRIC GENERATING SYSTEM WITH IMPROVED WATER PRESSURE ENHANCEMENT FEATURE ACTIVATION SYSTEMS

BACKGROUND OF THE INVENTION

The present invention relates to a hydroelectric power generating system for maximizing the use of water currents incident upon a set or series of wheels connected to an electric current generating system. In addition, the invention addresses the need to generate power from bodies of water heretofore incapable of being utilized as hydroelectric generating sources because the flow characteristics of the stream were considered below the threshold of desired pressures for use in generating systems. Further, the invention also includes a novel pump means that serves to enhance the incoming water pressure into the system creating additional pressure with which to drive the electric power generating set or sets of Pelton wheels. A further advantage to the pump means is that it is driven by external energy sources and requires little or no additional energy, other than that derived from naturally occurring forces, to drive it.

With the increased costs of electrical power generation from fossil fuels, the desire to generate energy without increasing pollution and the need for more power in all areas of consumption, it has become more important to find ways to generate electricity that use existing natural resources. This enhances the ability to add power sources in an economical fashion and to permit new avenues of supply to an increasing population and increasing demand without further burdening the environment. Thus there is increasing interest in use of tidal or coastal waterways which may be close or even not close to urban areas and, secondarily, in marginally flowing streams with low inherent water pressure stemming from the flow of the stream.

In the past, most of the hydroelectric power generation has been confined to waterfalls and dammed streams. These systems are highly successful because of the huge amount of pressure by the water in those locations, and the readily available ability to turn the turbines necessary to generate electricity. Of secondary interest have always been some attempts to harness the energy contained in slower moving river or tidal systems with less inherent pressure for driving the generation equipment. These systems were never popular because of the low return of power based on lack of sufficient water pressure to run the generation equipment.

In addition, with the high cost of construction of facilities in many areas, the amount of electrical return that the system provides is also a limiting factor. The cost of assembly and material transport many times makes the possible site impractical, thus scrapping the possibility of use due to poor return of investment.

This invention, therefore, addresses the ability to harness the energy incumbent in flowing water, either in a naturally flowing stream or in a tidal ebb and flow system or even in a combination of both systems. This is achieved by a transportable single or plurality of modules that are designed to enhance the natural flow characteristics of the stream by increasing the existing flow pressures and thus enabling the generation of hydroelectric power. These modules also contain a secondary set of Pelton wheels which serve to drive a pump mechanism to further enhance the pressure of the water incident upon the electric power generating Pelton wheels.

In addition to the secondary pump or in lieu of the secondary pump structure, another energy generating system is included in the invention. This system is driven by wind, solar or a combination of wind and solar to drive the secondary pressure enhancing pump. Because streams and bodies of water are located in areas that have wind pressure and/or solar also available, this makes the system highly responsive to all available environmental sources.

Attempts have been made in the past to fabricate a low water pressure hydroelectric generating system. One such unit is described in Kaeser, U.S. Pat. No. 4,746,808. Here a small portable unit uses an internal distribution chamber designed to compress the water stream into jets before the water is used on the Pelton wheel blades. However, in this system, the compressive force applied to the water flow is limited to the internal forces applied by the confinement of that chamber making the system still not fully maximized.

Kazanjian et al, U.S. Pat. No. 6,765,308 is another system that generates electricity from low pressure sources. In this reference, the pressurized water from a municipal water source is used as the generating force. No attempt is made to concentrate the water to increase the pressure to make the system more efficient.

Maloney, U.S. Pat. No. 6,824,347 is a further example of the use of municipal water systems for generation of electricity. Here the pressure differential between various distribution points is used to generate electricity. Again, the initial pressure is not optimized in any way.

Finally, Baarman et al, U.S. Pat. No. 6,798,080 describes a system that generates power via a nozzle arrangement that focuses water onto an impeller system to make enough electricity to power the electrical needs of the water treatment system. Because of the small amount of power generated by this system, it again is highly impractical for use in generation of power for external applications.

SUMMARY OF THE INVENTION

It is therefore an object of the invention to provide a hydroelectric power generating system for use in flowing bodies of water that maximizes the inherent pressure of the water flow by further constriction of the water mass at the proximal end of the system with respect to the normal water flow characteristics.

It is another object of the invention to provide a hydroelectric power generating system for use in flowing water bodies to provide a constriction at both the proximal and distal ends of the system to permit water constriction during incidents of water flow in the reverse direction to the normal water flow.

It is a further object of the invention to provide a hydroelectric power generating system that generates power from water streams of low pressure.

It is another object of the invention to provide a secondary pump system within the structure of the total unit which concentrates and enhances the water pressure of the flowing body of water prior to delivery to the electric power generating Pelton wheel structure.

It is yet a further object of the invention to provide a hydroelectric generating system that is capable of being assembled at a distant location then being able to be transported to a body of water and then installed as a unit.

In addition, it is another object of the invention to provide a system that is responsive to the available wind, solar or combinations of wind and solar.

DESCRIPTION OF THE PREFERRED EMBODIMENT

The preferred embodiments of the instant invention are described in terms of the FIGS. 1-13. Identical elements contained in various figures are designated with the same numeral in each figure.

Figure 1:
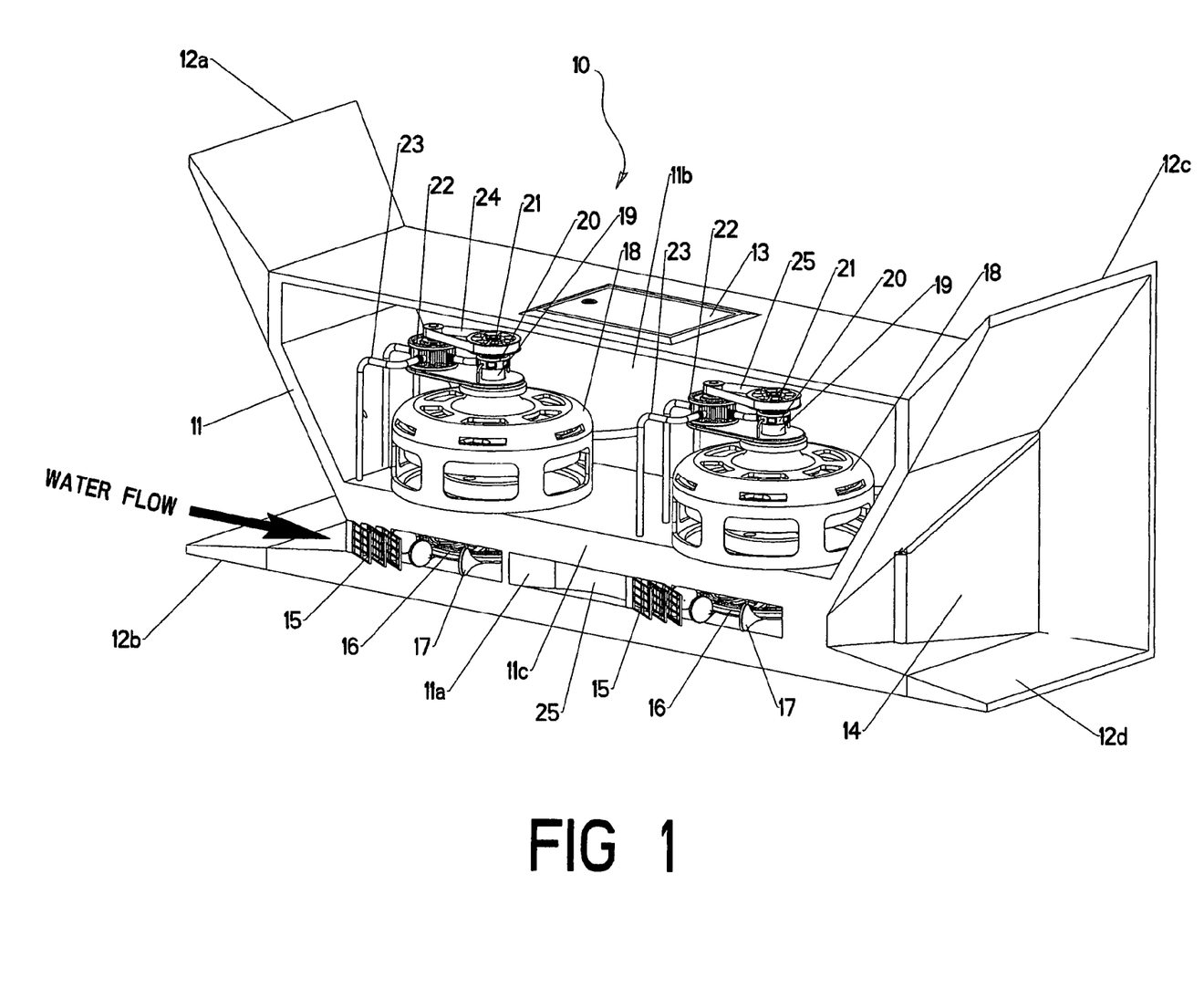
FIG. 1 is an overall cross-sectional view of the power generating system or module of the instant invention, showing the location of the external water concentrating features and the overall layout of the Pelton wheels, pump, clutch system and generators.

Referring now to FIG. 1, the overall design of the transportable hydroelectric power generating system 10 is shown. The hydroelectric power generating system comprises a housing 11 which includes a main body which is open to the flowing water shown by 11a and a sealed portion 11b which allows for the generators and pumps to operate in atmospheric conditions and not in an aqueous environment. This housing, depicted in FIG. 2, may be made of any suitable material which is capable of rendering a protective environment for the system 10, and may be selected from metals, concrete, fiberglass, engineering plastics or other materials as known to those of ordinary skill in the art. The housing includes flanges 12a, 12b, 12c and 12d which are water channeling features. A trap door 13 is also included for easy access to the sealed portion of the housing 11b, so that maintenance may be performed when needed. This door may be of any convenient size and may be made of the same or different materials as the housing 11.

Figure 2:
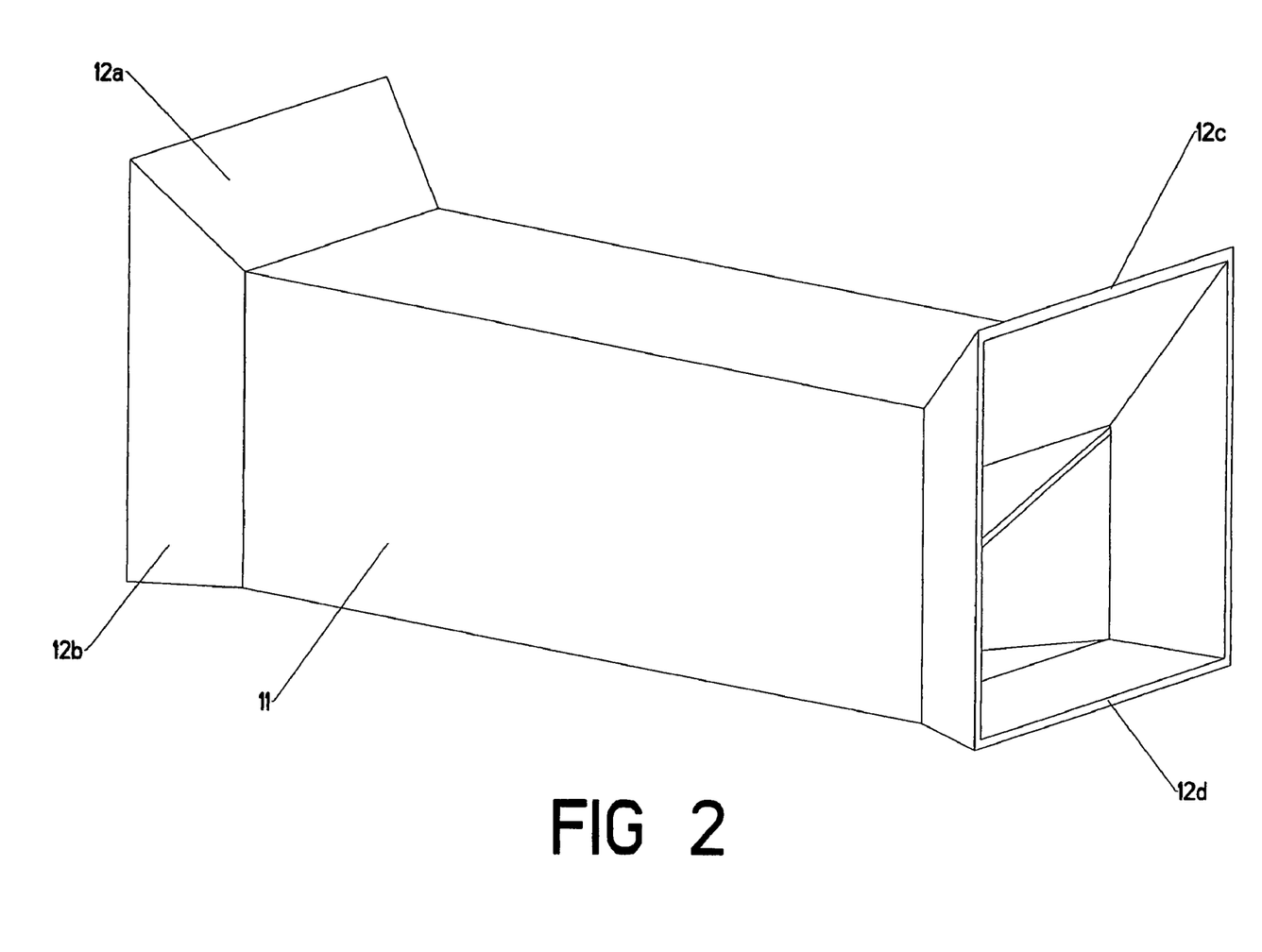
FIG. 2 shows the housing feature of the instant invention.

The overall size of the housing 11 may be of any desired size for the particular application with consideration made for the ease of transport to the desired location as well as equipment needs for that specific location taken closely into consideration. Because each end location is unique, the instant systems are capable of being produced to tailor the equipment to the specific needs of the end environment in size, material and internal components. The housing in operation is designed to be fully or partially submerged into the water system and may be placed into that system in direct contact with the bottom of that system or mounted on supports either placed into the water system prior to installation, supports mounted on the housing before installation or both. In addition anti-fouling coatings may be used on any of the surfaces in contact with the water in the water system, including the housing 11, the impellers 17 and 91, and the support mechanisms (not shown).

Figure 7:
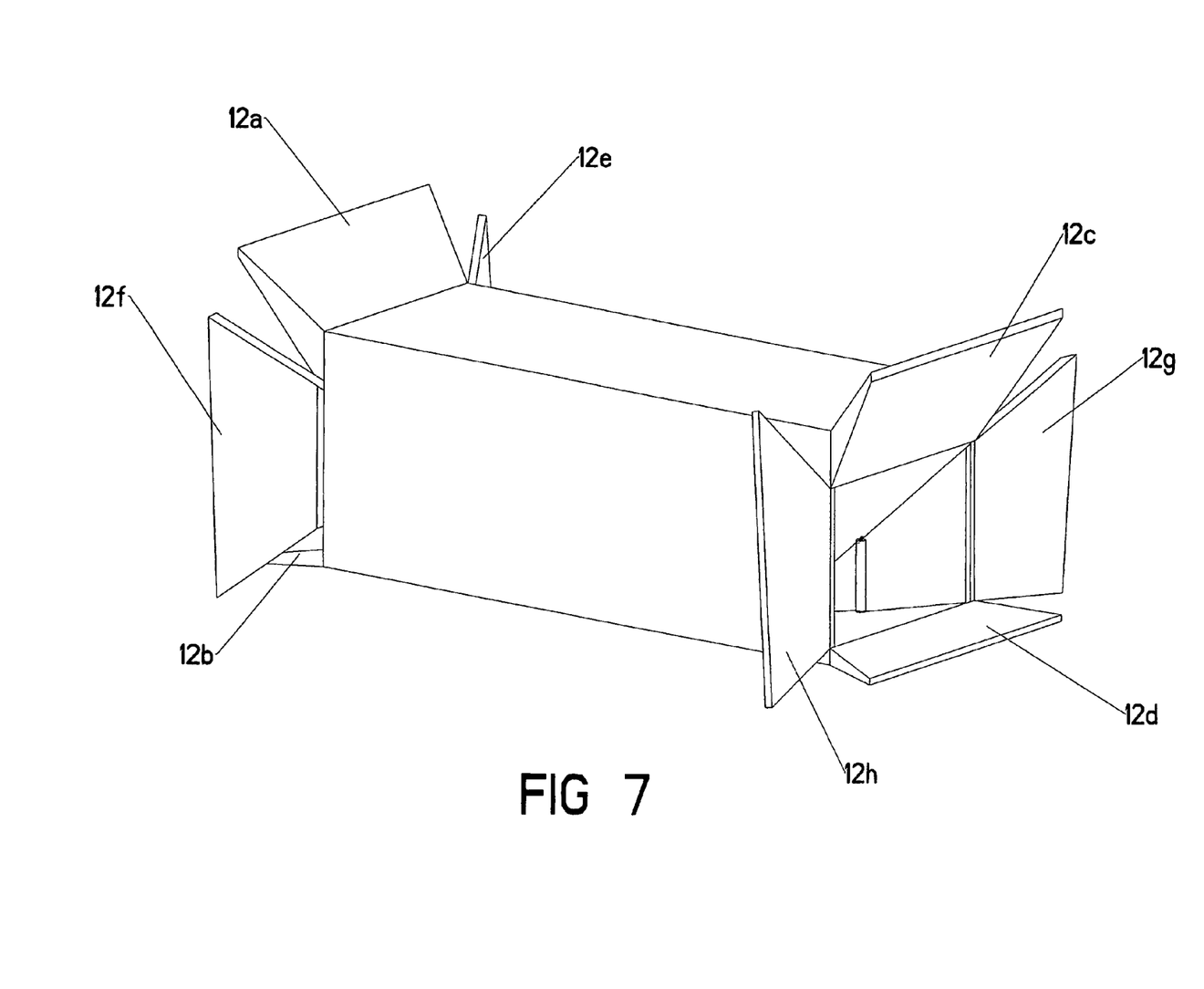
FIG. 7 is a depiction of an embodiment with movable flanges.

As shown in FIGS. 1 and 2, the flanges 12a and 12c radiate outwardly at a fixed angle relative to the body of the housing 11, and this angle may be varied to accommodate the site in terms of the size of the angle with respect to the longitudinal axis of the body of the housing 11, and they may be either fixed as shown or movable to accommodate a variety of angles as depicted in FIG. 7. In this FIG. the flanges 12e, 12f, 12g and 12h are shown as being hinged to permit variation of the orifice that allows ingress and/or egress of the water into and out of the system. This feature allows for adjustments to be made to the intake portion of the system when the water flow varies, such as in streams which have seasonal differences such as increased flow with snow melt. By virtue of the shape of the angular flanges 12, increased water pressure is obtained by the depression of the flowing stream into a smaller, more compact stream which increases the pressure of the water stream from that which it possesses solely from its flow characteristics. In addition, during periods of high flow and pressure, the system may be readjusted to permit optimization of the pressure within the system so that a steady stream of pressurized water is delivered to the water wheels. The adjustments may be made by any means known to those of ordinary skill in the art and may range from manual to mechanical all the way to electrical means to vary the angles.

The secondary flanges 12b and 12d may also be of any chosen angle with respect to the longitudinal axis of the housing 11, and again may be fixed or movable. It is notable that in the preferred embodiment, the flanges 12a, 12b, 12c and 12d increase in thickness from their smaller size at the distal ends and larger size at their proximal ends with respect to the housing. This thickness permits rigid stability but may be varied or non-existent as desired.

A water flow gate 14 is included in one or both ends of the housing to regulate the flow of water through the lower portion of the housing 11. This gate may be manually, mechanically or electronically operated to adjust the system to the varying conditions such as reverse flow. In some cases where the system is used in tidal or similar conditions a programmable timer may be used to automatically change the settings of the gate system. In addition a sensor based system may be used that would automatically trigger gate opening and closing with a pre-determined change in pressure incident upon the gate 14.

In the main portion of the housing 11, the lower portion 11a, is open to the stream of water. This permits intake of additional water other than through the main end portion of the system as defined by the flanges 12. Each intake section has a series of nets 15 which deflect debris, marine life and other material contained within the stream. In the preferred embodiment, the nets or screens have large enough orifices to permit easy flow of water but small enough to deflect undesired material. By use of a series of staggered nets, that material which is not deflected by the first net or screen will be deflected by the next in the series. For illustration purposes, three are shown in FIG. 1, but any number as deemed necessary by one of ordinary skill in the art may be used as dictated by the amount of undesired material contained in the particular body of water in which the system is placed. In addition to nets, any other suitable debris and marine life deflector may be used.

The lower portion of the system 10 contains the Pelton wheels 16. As shown, two are contained in the drawing, but any number as desired may be included within the housing depending on the application. A single row of wheels is depicted by FIG. 1, but a plurality of stacked wheels may also be used. The impellers 17 as shown are conical in shape but may be of any desired shape that maximizes the temporary entrapment of the water which moves the wheel 16. The impellers 17 are fixed with respect to the wheel 16 in the preferred embodiment but may also be constructed so that they may be rotated around their attachment axis.

Figure 9:
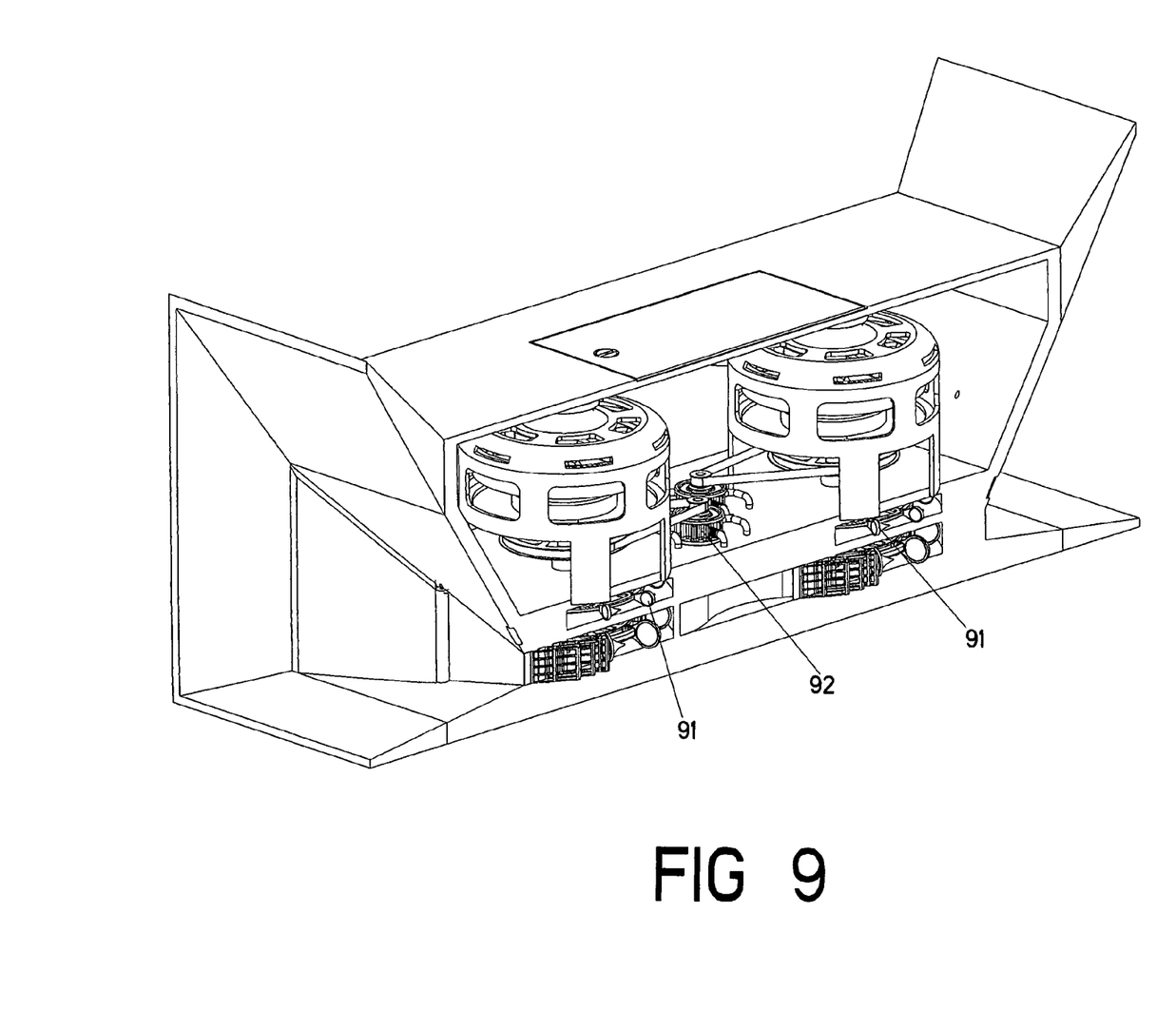
FIG. 9 is a depiction of the interior of the module showing the two sets of Pelton wheels, one for driving the pump mechanism and the second for the electrical power generation.
Figure 10:
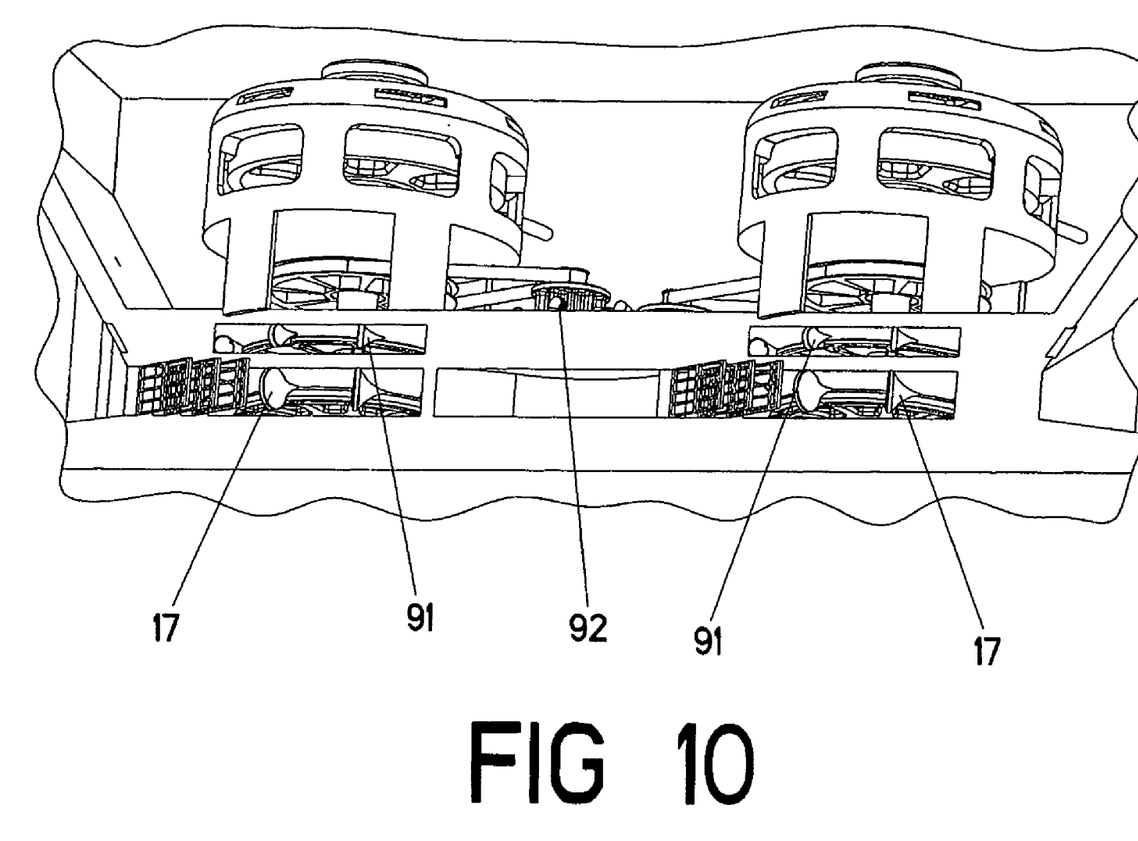
FIG. 10 is another view of the dual wheel structure showing both sets of Pelton wheels.

Above the Pelton wheels 16, a secondary Pelton wheel assembly is shown in FIGS. 9 and 10. These Pelton wheels 90 serve to drive the pressure enhancement pump 92 which takes a portion of the incumbent water steam and delivers it at an increased pressure to the impellers 17 of the main Pelton wheel structure. This enhancement serves to increase the pressure of the water in the system without consumption of any energy necessary to drive the pump feature. Thus the energy gain from the system is further maximized without the use of any external energy sources.

Figure 11:
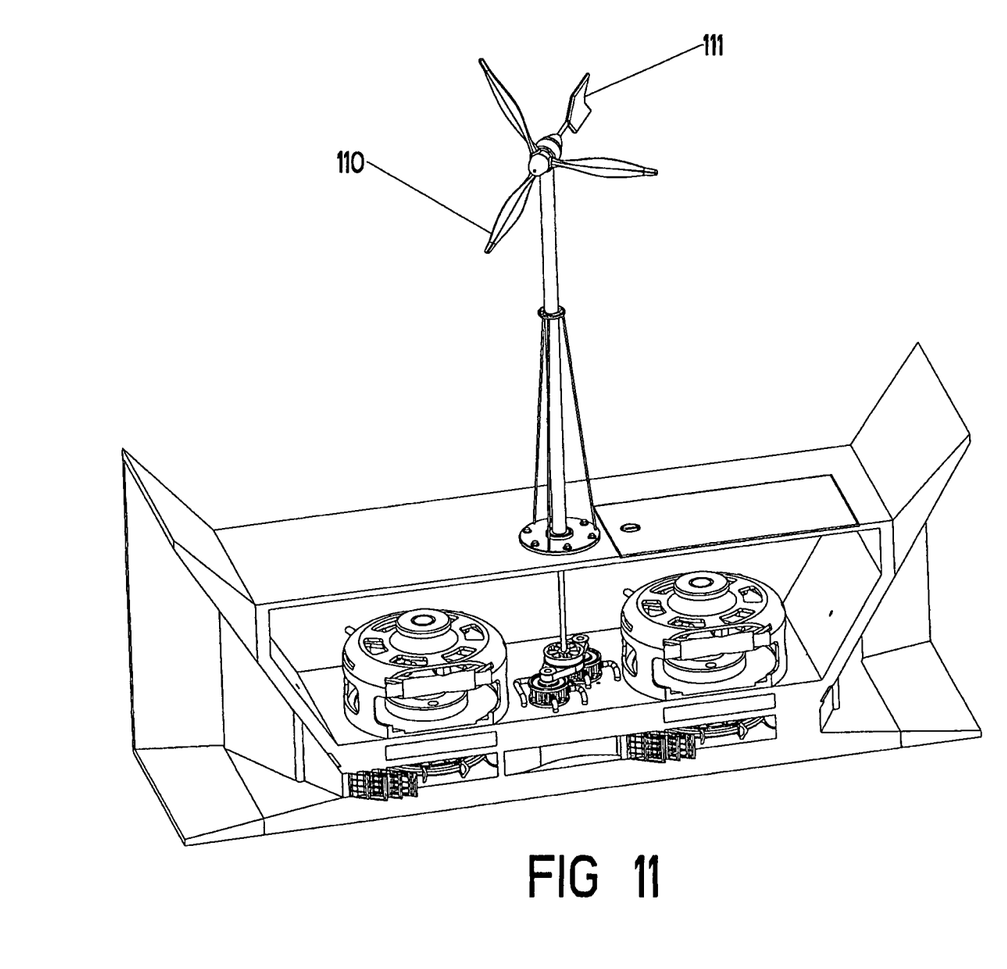
FIG. 11 is a depiction of the wind version of the supplemental energy source.

Instead of the use of the second set of Pelton wheels 90, FIG. 11 shows one version of the alternative power sourcing of the instant invention. In this drawing, the transportable unit is outfitted with a wind vane 110, so that air currents in the locality of the transportable unit 10 can be utilized to drive the secondary pump, thus enhancing the ability of the unit to generate electricity. In addition to the actual vanes in the structure, the wind vane 110 also has a positioning vane 111, so that it can operated to accommodate changes in the actual direction of the wind.

Figure 12:
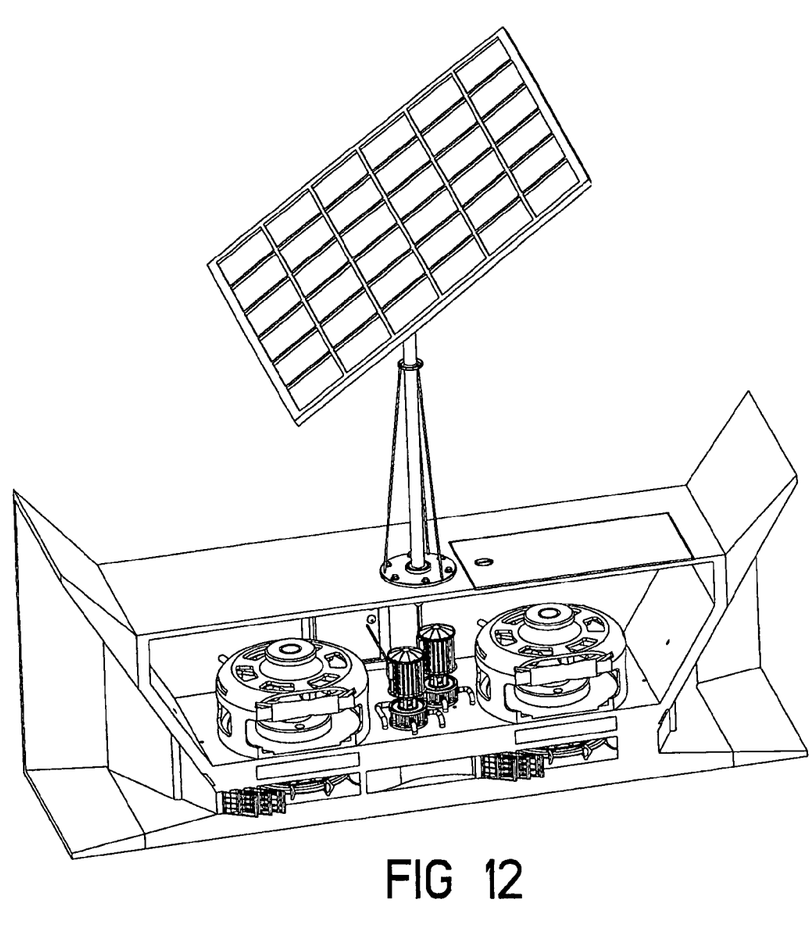
FIG. 12 shows the solar version of the supplemental energy source.

Another alternative secondary energy boosting device is shown in FIG. 12. In this drawing, a solar collector is used to generate the electric power necessary to drive the secondary pump in the transportable unit. In addition to the actual collector, the transportable unit in this embodiment may have a battery storage unit so that current can be stored for use when necessary.

Figure 13:
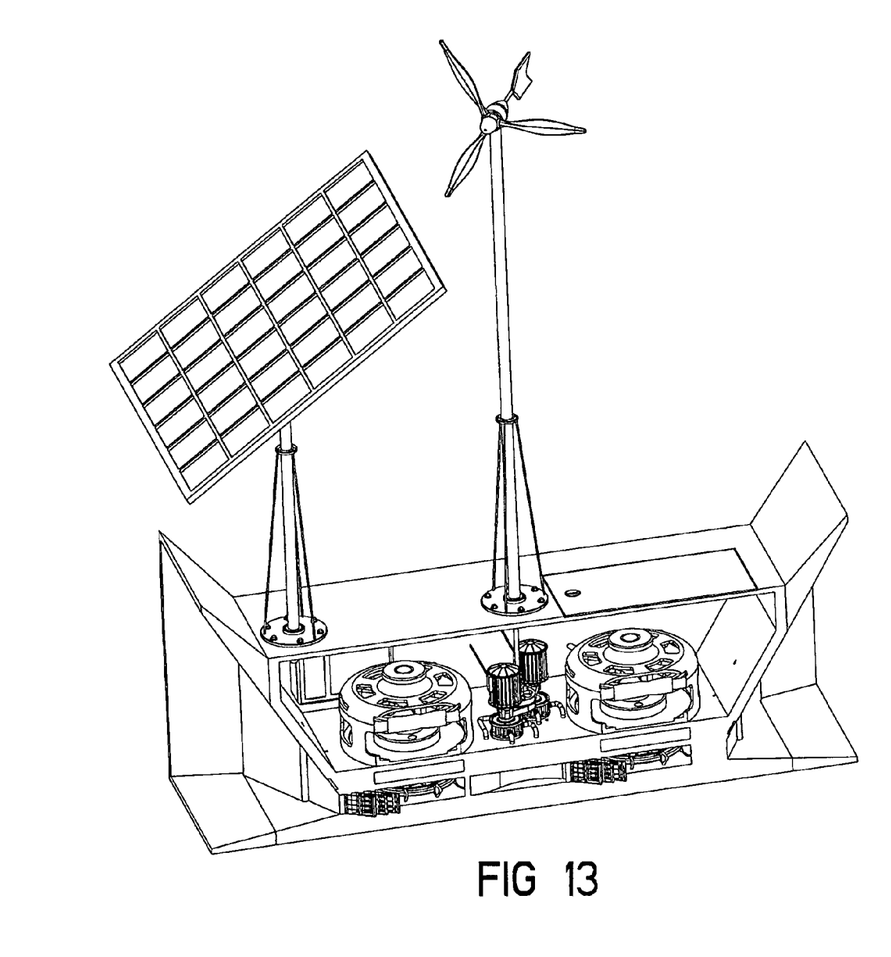
FIG. 13 is the combination of wind and solar version of the supplemental energy source.

A third embodiment is shown in FIG. 13. Here, both the solar and wind systems are used, thus giving the unit the ability to derive energy for either or both systems at any given time. In this case where neither system is reliable, this affords the ability to generate from either or both systems.

The further embodiments are depicted in contemplated but not shown. In these embodiments, the wind, solar, and wind with solar embodiments are combined with the internal pump driven by the secondary set of Pelton wheels. This gives the maximum amount of ability to create electric current using natural energy forces without having to add energy to the system. An additional battery system powered by the natural systems may also be present for storage or any other purposes. The energy derived from the secondary natural forces may be stored in the batteries and utilized whenever necessary. This allows for maximum utilization of the pump at any desired time. It is contemplated that an external energy source is not needed because of the multiplicity of available sources in the system, but a backup can be added by one of ordinary skill in the art.

The systems depicted show one source of wind or solar power, however, it is contemplated by the instant invention that more than one wind vane or solar collector or any combinations of the same may be present as chosen by one of ordinary skill in the art. This allows for maximum energy derivation to be made from any chosen site given the due to the wide degree of adaptability of the system herein described.

The upper portion 11b of the housing 11 contains the generators 18 which are connected to the Pelton wheels 16 by shaft 19. The generators are also connected to external electrical means which conveys the produced current from the system. The electrical generators are of any type as selected by one of ordinary skill in the art. Because of the nature of the equipment housed in the upper portion 11b of housing 11, water is prevented from entering the upper portion 11b by intermediate housing portion 11c.

Figure 8:
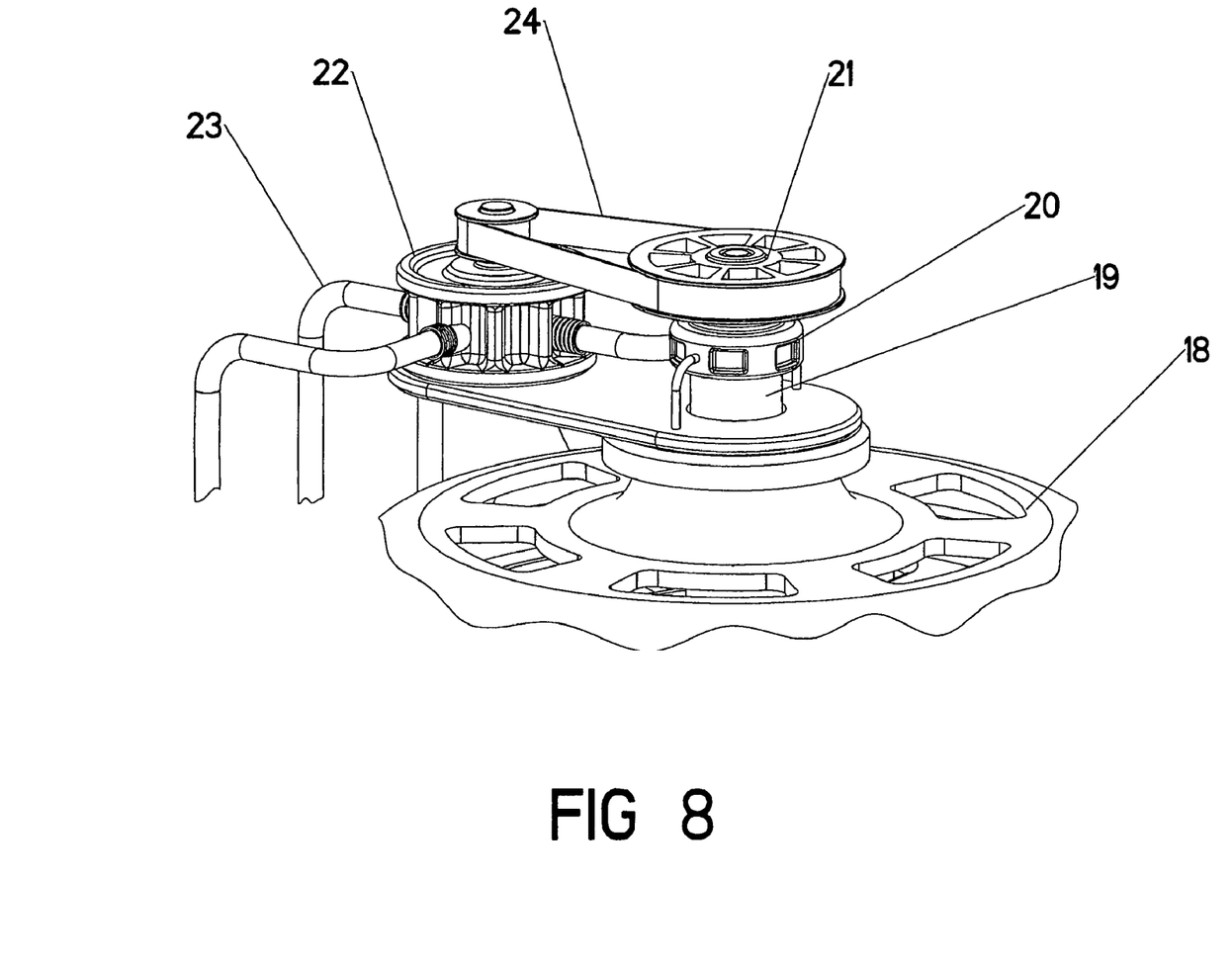
FIG. 8 is a close-up view of the pump and clutch features of the invention.

Shaft 19 extends above the generators 18 to clutch 20, pulley 21 and belt 24. This feature is depicted in FIG. 8. This feature of the system 10 further enhances the pressure characteristics of the system. In operation, the Pelton wheels 16 and 91 are initially rotated by the pressure of the water channeled by the external flanges 12 into the system or by secondary inlet 25. As the Pelton wheels 16 and 91 rotate shaft 19, the speed of the rotation of the Pelton wheels 16 increases. The pump 22 is operated by a separate set of Pelton wheels located above or below the generator Pelton wheels 18. Since the size of the pump Pelton assembly requires less pressure to activate and run, it rotates easier than the generator Pelton wheels 17, thus making the system start-up easier. With the pump feature helping to drive the larger generator Pelton wheels by virtue of the additional water pressure, the system is far more efficient with its use of water pressure in the flowing body of water.

Figure 3:
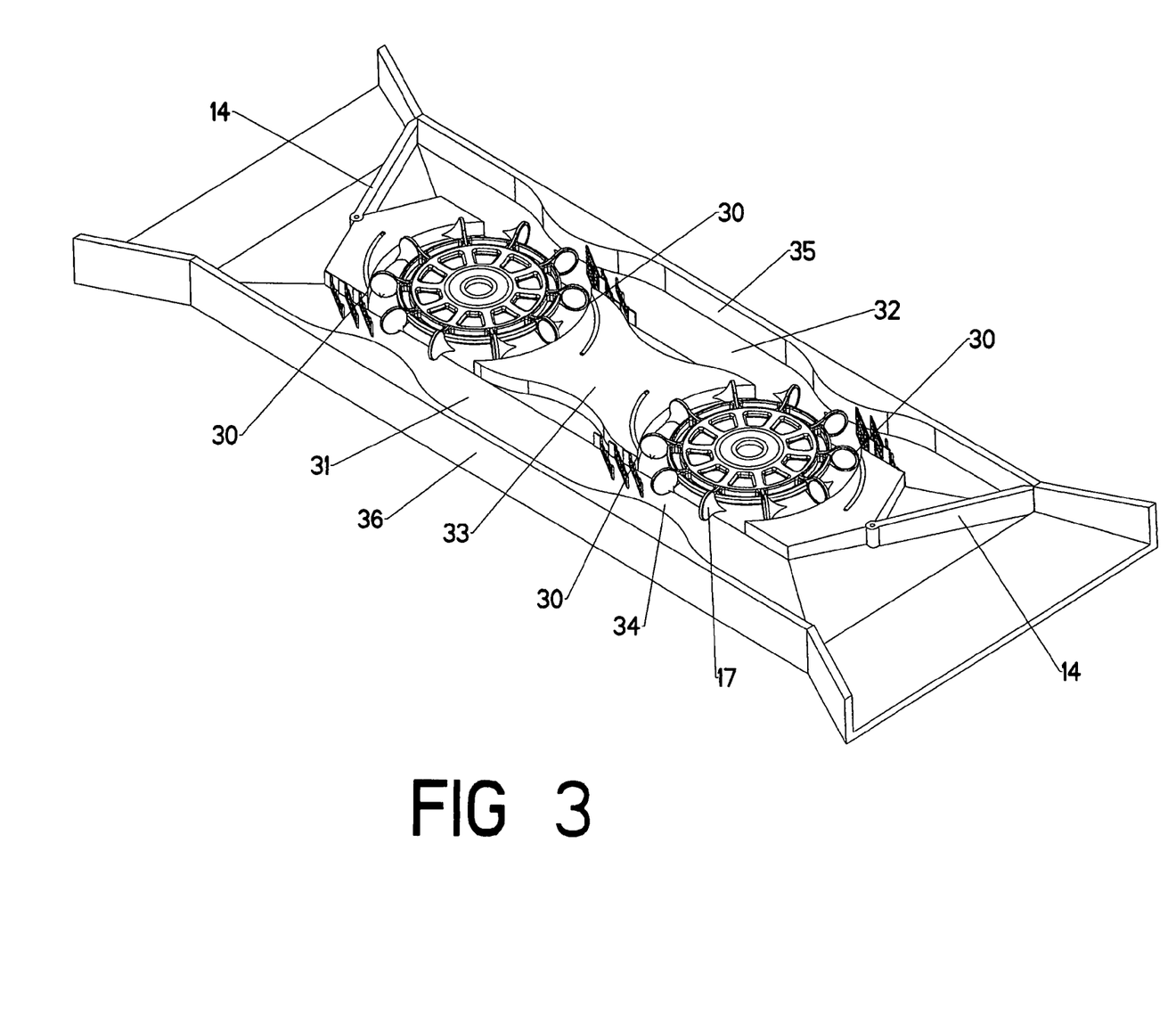
FIG. 3 shows the Pelton wheel structures including the concentrated water nozzles and filter screens.
Figure 4:
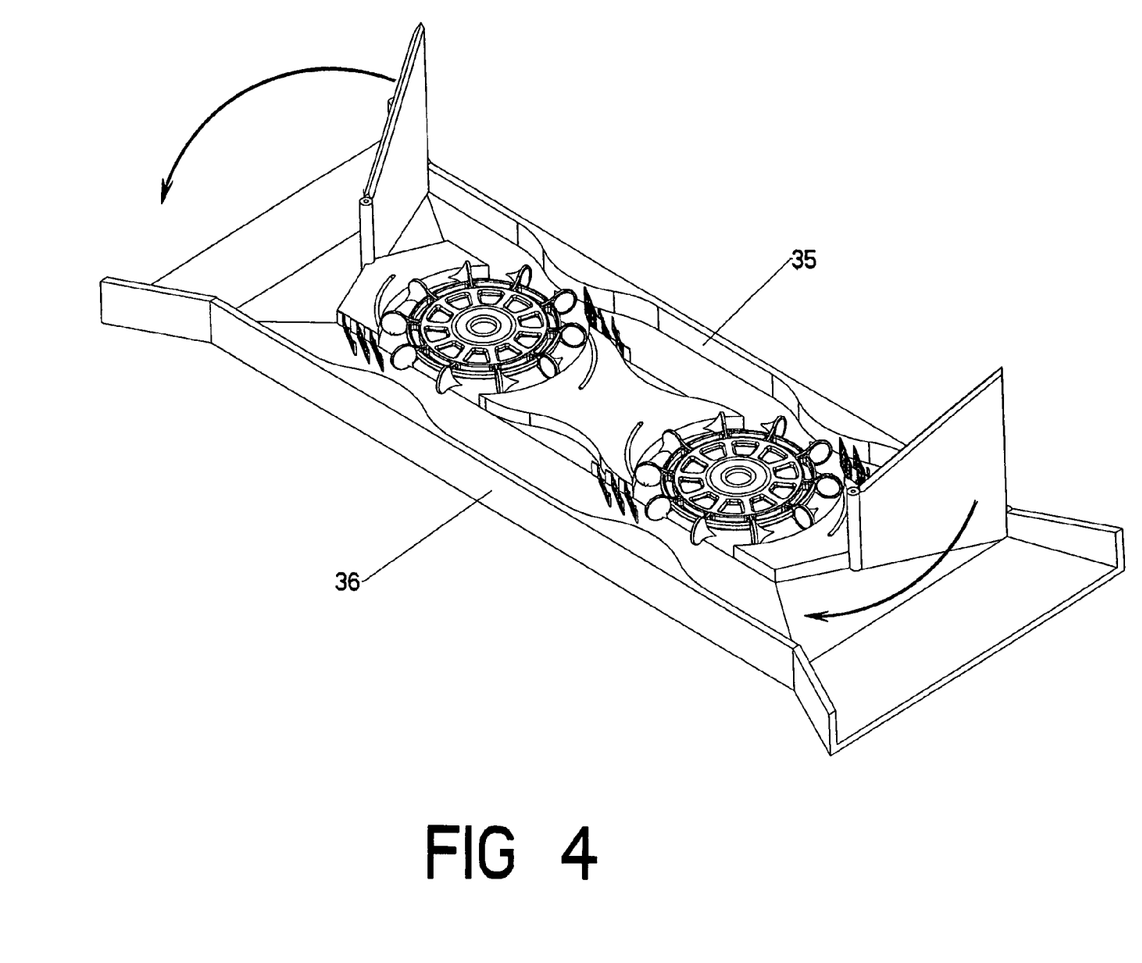
FIG. 4 depicts the gate features which permit reverse water flow conditions.
Figure 5:
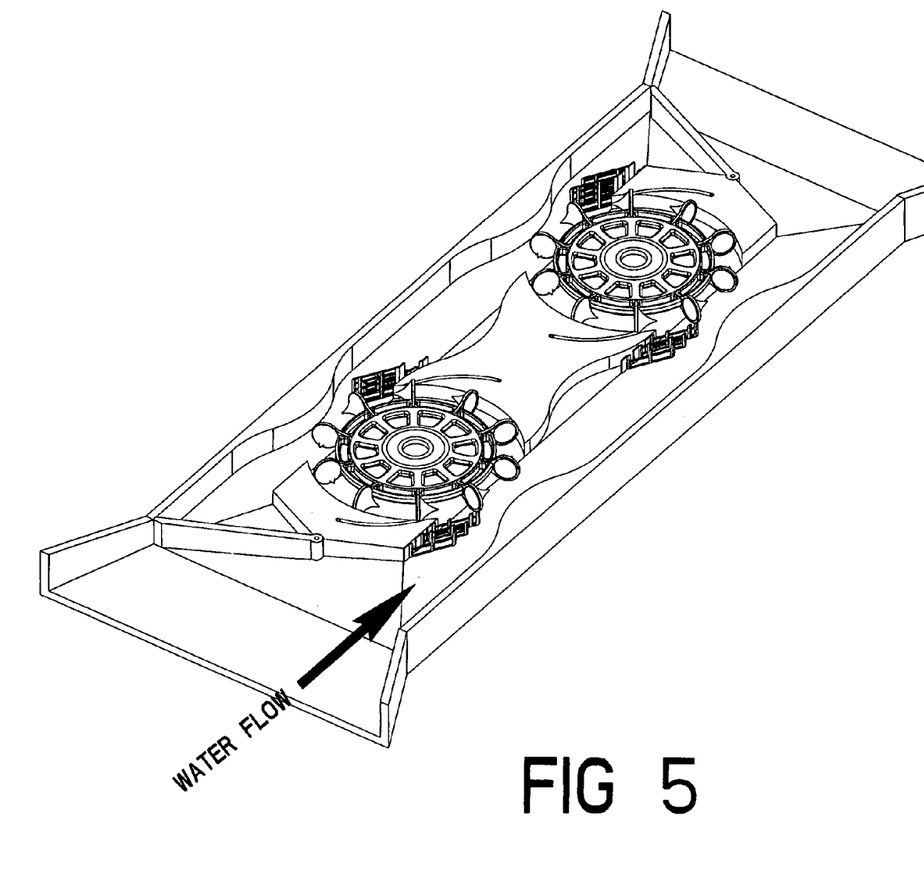
FIG. 5 shows the gate and water flow set-up for one direction of water flow.
Figure 6:
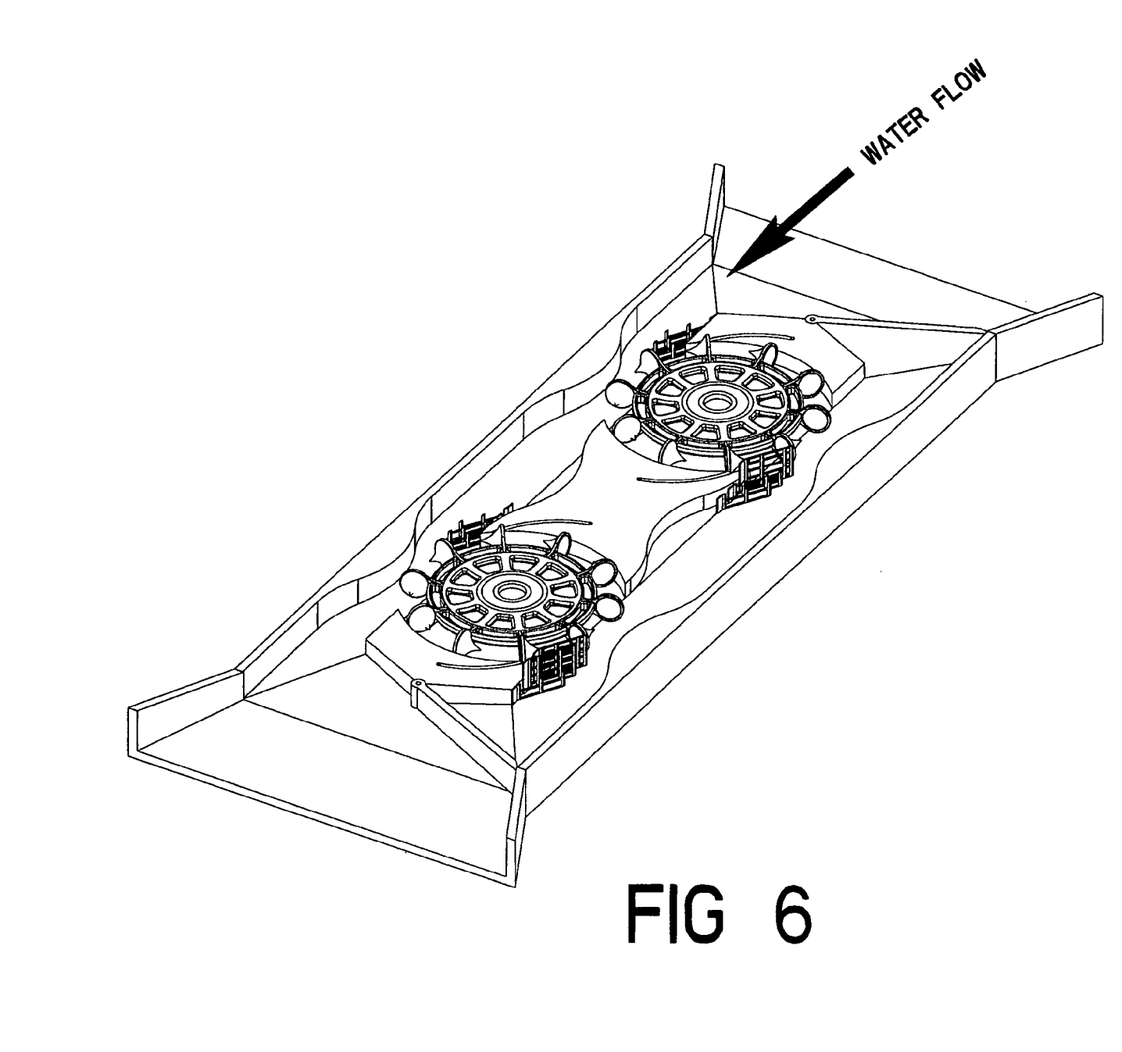
FIG. 6 shows the gate and water flow set-up for reverse water flow conditions.

The water pumped by pump 92 is recirculated back to the lower portion 11a of the housing 11. The water is then directed by nozzles 30 onto the impellers 17 on the Pelton wheels 16 as shown in FIG. 3. By contacting the impellers 17 with the pressurized water, additional or faster rotation occurs thus increasing the output of generators 18.

In addition to the pump 22 feature that enhances the water flow and resultant pressure to the system 10, water channels 31 and 32 enhance the flow of water delivered to the impellers 17. This is best shown in FIG. 3. Here a spacer portion 33 between the two Pelton wheels has an arcuate portion which helps to direct the flow of the incoming water into the channel area 34 which narrows at the impellers 17 thus creating increased water pressure to the impeller portion of the Pelton wheels. This is another pressure enhancing feature of the instant invention.

In full operation the flowing water would enter the system 10 via the flanges 12a and 12b and also via secondary inlet 25 and be channeled by water channel 31 to concentrate the water onto the impellers 17. A small portion of the flowing water would be drawn up by the pump 22 from the channel 31 (not shown) and routed via the pump 22 back to the impellers 17. Of course, before full operation of the system occurs, the pump feature would not be present. The flowing water then exits the system 10 via the flange system 12c and 12d.

At times when the flowing stream of water is reversed, the system 10 has a secondary ability to generate electricity by making use of the reverse water flow energy. During reverse flow, the gates 14 close the primary flow channel 31, allowing water to flow into channel 32. As shown the water would flow between the two Pelton wheels but in some applications a gate in the housing 11 may be also present to allow the system to be a mirror image during reverse flow. This gate 35 may be opened and a second gate 36 on the opposite or primary side may be closed so that the system operates the same with water flow in both directions. The operation of the gates 14 and gates 35 and 36 are better shown in FIG. 4-6.

The systems 10 when installed in the body of water may be singly or in multiples. When multiple systems are employed, they may be of differing sizes or the same size and may be placed in any configuration in the body of water. The electrical output may thus be obtained from the multiple systems in series or in parallel.

The systems are intended to be manufactured off-site and transported to the body of water. The transportation may be by any conventional means such as trucking or barge. In some instances, the final assembly of the unit may be done on-site instead of fully in a factory setting.

Modification and variation can be made to the disclosed embodiment of the instant invention without departing from the scope of the invention as described. Those skilled in the art will appreciate that the applications of the present invention herein are varied, and that the invention is described in the preferred embodiment. Accordingly, additions and modifications can be made without departing from the principles of the invention. Particularly with respect to the claims, it should be understood that changes may be made without departing from the essence of this invention. In this regard, it is intended that such changes would still fall within the scope of the present invention. Therefore, this invention is not limited to the particular embodiments disclosed, but is intended to cover modifications within the spirit and scope of the present invention as defined in the appended claims.

We claim:

1. A hydroelectric power generating system comprising:
   a. a housing, said housing comprised of a body portion and two flange portions attached to the proximal and distal ends of the body portion;
   b. a first water wheel mounted within the housing body portion, said water wheel having a plurality of impellers for contact with a flowing water stream;
   c. a second water wheel having a plurality of impellers for contact with the flowing water stream driven by a pump mechanism which concentrates the water from the flowing water stream onto the impellers on the first water wheel;
   d. a secondary energy source in electrical communication with the pump mechanism, said energy source connected to a system outside the housing for deriving energy from naturally occurring forces; and
   e. an electrical generating system in communication with the water wheel mounted in the body of the housing for generation of electrical current.

2. The hydroelectric power generating system of claim 1, wherein the naturally occurring force is selected from the group consisting of wind, solar or combinations thereof.

3. The hydroelectric power generating system of claim 2, wherein the energy generated from the naturally occurring force is collected in a battery system.

4. The hydroelectric power generating system of claim 2, wherein an additional water driven system is included within the housing for driving the pump.

5. The hydroelectric power generating system of claim 4, wherein the water driven system works in concert with the naturally occurring force system.

6. The hydroelectric power generating system of claim 2, wherein the naturally occurring force is comprised of a plurality of units responding to the naturally occurring force.

7. The hydroelectric power generating system of claim 1, wherein the pump is used to concentrate a portion of the water flowing in the system onto the water wheel impellers.

8. The hydroelectric power generating system of claim 1, wherein the housing has debris deflecting means.

9. The hydroelectric power generating system of claim 8, wherein the debris deflecting means comprises a plurality of nets.

10. The hydroelectric power generating system of claim 1, wherein the housing also includes a trap door.

11. The hydroelectric power generating system of claim 1, wherein there are a plurality of water wheels and generators located in the housing.

12. The hydroelectric power generating system of claim 1, wherein the water wheels have a single layer of impellers.

13. The hydroelectric power generating system of claim 1, wherein the water wheels have multiple layers of impellers.

14. The hydroelectric power generating system of claim 1, wherein the housing includes movable gate means.

15. The hydroelectric power generating system of claim 1, wherein the housing as a separating means within the body of the housing for separation of the water wheel from the electrical generating system.

16. The hydroelectric power generating system of claim 1, wherein the housing is of a size that it is transportable.

17. The hydroelectric power generating system of claim 15, wherein the system is assembled prior to being transported to the flowing water stream.

18. The hydroelectric power generating system of claim 1, wherein the system is placed on the bottom of the flowing water stream.

19. The hydroelectric power generating system of claim 1, wherein the system is placed on supports mounted in the flowing water stream.

20. The hydroelectric power generating system of claim 19, wherein the secondary power source is electric in nature.

* * * * *